(12) United States Patent
Castensson

(10) Patent No.: US 6,250,647 B1
(45) Date of Patent: Jun. 26, 2001

(54) SLOWLY EXPANDING GASKET AND METHOD FOR USE THEREOF

(75) Inventor: Per Castensson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/345,733

(22) Filed: Jul. 1, 1999

(30) Foreign Application Priority Data

Jul. 29, 1908 (SE) .................................. 9802366

(51) Int. Cl.[7] .................................... F16J 15/02
(52) U.S. Cl. ............................. 277/630; 277/650
(58) Field of Search .................. 277/316, 606, 277/630, 650; 428/160, 161, 304.4

(56) References Cited

U.S. PATENT DOCUMENTS

| | | |
|---|---|---|
| 4,299,921 * | 11/1981 | Youssef . |
| 4,399,317 * | 8/1983 | Van Dyk, Jr. . |
| 5,486,010 | 1/1996 | Hamilton et al. . |
| 5,541,813 | 7/1996 | Satoh et al. . |
| 5,550,324 | 8/1996 | Black et al. . |
| 5,558,804 | 9/1996 | Doss-Desouza . |
| 5,647,255 * | 7/1997 | Stone . |
| 5,770,674 * | 6/1998 | Cageao et al. . |

FOREIGN PATENT DOCUMENTS

| | | |
|---|---|---|
| 504 444 | 3/1971 | (CH) . |
| 195 05 125 | 8/1995 | (DE) . |
| 0 650 315 | 4/1995 | (EP) . |
| 1 113 386 | 5/1968 | (GB) . |
| 98/37742 | 2/1998 | (WO) . |

* cited by examiner

Primary Examiner—Robert J. Sandy
Assistant Examiner—Karlena D Schwing
(74) Attorney, Agent, or Firm—Burns, Doane, Swecker & Mathis, L.L.P.

(57) ABSTRACT

A gasket and/or sealing material is used in sealing a cellular telephone. A method for assembling a gasket and/or sealing material for sealing a cellular phone is also provided.

3 Claims, 1 Drawing Sheet

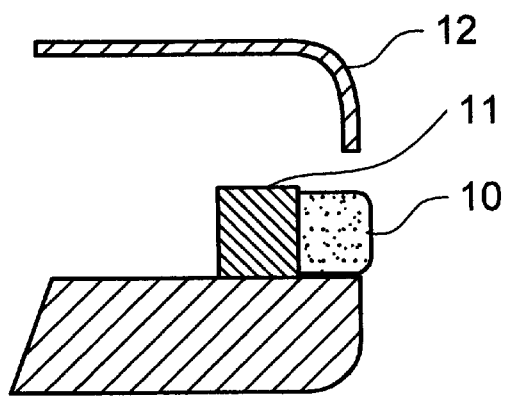
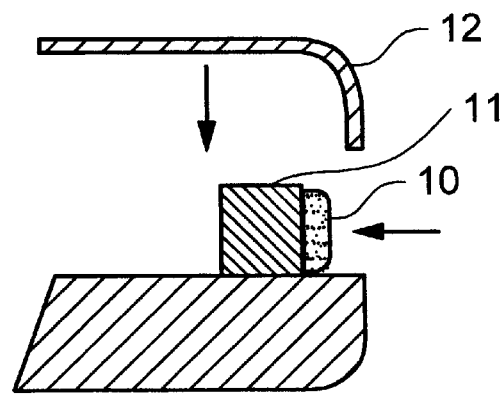
FIG. 1  FIG. 2
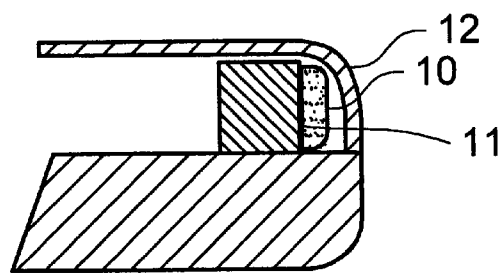
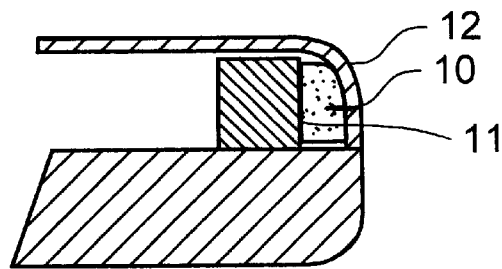
FIG. 3  FIG. 4

SLOWLY EXPANDING GASKET AND METHOD FOR USE THEREOF

TECHNICAL FIELD

The invention relates to a gasket and/or sealing material for use in sealing a cellular phone. The invention also relates to a method for assembling a gasket and/or a sealing material for sealing a cellular phone.

BACKGROUND

Various types of gaskets are needed in cellular phones. Their purpose is to create acoustic sealing, to prevent dust from penetrating into the phone, to provide EMI-shielding etc.

The currently employed gaskets of the above mentioned type are made of soft elastic foam plastic and sealing is obtained when the gasket is compressed. To achieve an efficient sealing the compression of the gasket must be as large as possible, i.e. the uncompressed gasket must have a considerable thickness in order to obtain a tight sealing in its compressed state. However, it may be very difficult to assemble a phone with thick gaskets since the uncompressed gaskets interfere with the mating components and therefore require excessive force to be applied.

A gasket intended for use as a fluid seal in a plate and frame apparatus, such as a heat exchanger, is disclosed in U.S. Pat. No. 5,486,010. The gasket material comprises a core of elongated and preferably expanded polytetrafluoroethylene (PTFE) contained within a tight wrap of high strength film. The gasket is pre-compressed to aid installation by forming the gasket under pressure to the desired shape. However, the densification should not be so great that further compression and fitting of the gasket cannot occur during actual installation. Sealing is only obtained at the final compression when the plates are stacked in series and mounted between frames which then are tightened by means of compression bolts.

SUMMARY

The object of the present invention is to achieve an improved gasket and/or sealing material for use in sealing a cellular phone providing a solution to the above mentioned problems and drawbacks when assembling the phone.

The object of the present invention is obtained by a gasket and/or sealing material.

Another object of the present invention is to provide a method for assembling a gasket and/or sealing material for sealing a cellular phone.

By manufacturing the gasket from slowly expanding cellular plastic, e.g., polyurethane foam (PUR), expanded polyethylene or polyvinylchloride, the gasket may be pre-compressed before assembling the phone. In this way the installation of the gasket material can be greatly enhanced by pre-compressing the gasket prior to installation. Since the gasket has the benefit of staying in its compressed state for several seconds, the phone can easily be assembled with the gasket of the invention still in its compressed, state. Not until after the phone has been assembled, the gasket expands and seals against a mating component. Preferably the gasket according to the invention is pre-compressed to more than approximately 50% of its original thickness.

BRIEF DESCRIPTION OF THE DRAWINGS

Preferred embodiments of the invention will be described in more detail in the following, reference being made to the accompanying drawings, in which FIG. 1 is a cross sectional view showing a gasket according to the invention in its initial uncompressed state, FIG. 2 is a cross sectional view showing the gasket of FIG. 1 in its pre-compressed state before assembly of a mating component, FIG. 3 is a cross sectional view showing the gasket still in its compressed state when the mating component of FIG. 2 has been assembled, and FIG. 4 is a cross sectional view of the gasket in its final expanded state.

DETAILED DESCRIPTION

In FIG. 1 an embodiment of the present invention is shown, wherein an elastically deformable gasket and/or a sealing material 10 is installed in a cellular phone in order to e g provide acoustic sealing, prevent dust from penetrating into the phone etc. The gasket 10 of the invention is not intended to withstand large pressures and therefore does not provide a seal against e g fluids.

A suitable material for the gasket and/or sealing material 10 is a soft, deformable, elastic, cellular plastic. One such plastic material is for instance polyurethane foam (PUR) which is used today, e g in ear plugs, and has the property of especially slow expansion. Other possible materials for the gasket 10 of the invention are expanded polyethylene, expanded polyvinylchloride or foamed latex.

The gasket 10 of the invention is mounted in its uncompressed state in a component 11 of a cellular phone. In order to facilitate the assembly of a mating component 12, i.e. a front cover, to the cellular phone component 11, in FIG. 2, the gasket 10 is compressed before assembly. Preferably, the gasket 10 is pre-compressed to more than approximately 50% of its initial thickness.

In FIG. 3 is shown how the mating component 12 easily may be assembled while the gasket 10 stays in its compressed state. Due to the slow expansion of the gasket according to the invention, assembly of cellular phones may be achieved without requirement of undue torque or force of the mating components 11 and 12, respectively.

In FIG. 4 the recovered gasket 10 can be seen in its final state where it seals against the surface of the mating component 12. By installing the gasket and/or sealing material by the method of the invention, production of phones can be enhanced as well as accelerated, and at the same time excellent sealing can be achieved.

The present invention has been described above with reference to a preferred embodiment. It is, however, to be understood that the present invention shall only be limited by the scope of the appended patent claims.

What is claimed is:

1. A method for assembling a gasket and/or sealing material in a device having a plurality of components, the gasket and/or sealing material being made of an elastic cellular plastic material which can be elastically deformed, and slowly expands after compression, the method comprising the steps of:

compressing the gasket from a first thickness to a second thickness;

interposing the gasket between at least one surface of a first component and at least one surface of a mating component; and assembling the device by coupling the first component to the mating component with the compressed gasket interposed there between, such that, after assembly, the compressed gasket slowly expands from the second thickness to a third thickness less than the first thickness to seal the gasket against the surfaces of the first component and the mating component.

2. A method according to claim 1, wherein the second thickness is less than 50% of the first thickness.

3. The method according to claim 1, wherein the device is a cellular telephone.

\* \* \* \* \*